No. 664,190. Patented Dec. 18, 1900.
E. THOMSON.
ALTERNATING CURRENT ELECTRIC MOTOR.
(Application filed Aug. 19, 1897.)
(No Model.)
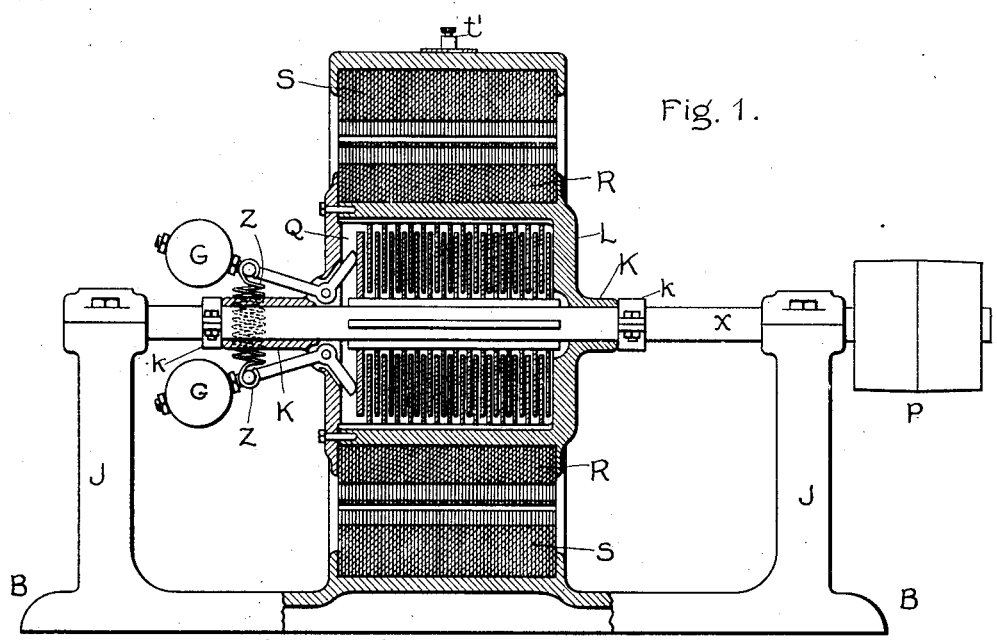
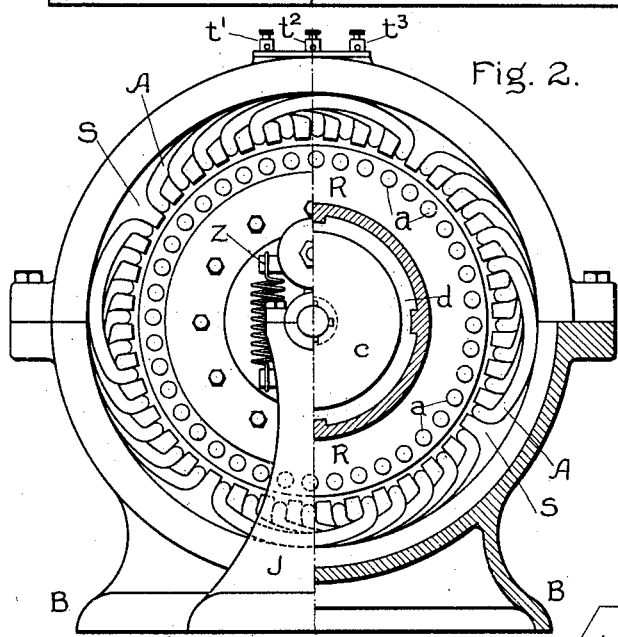
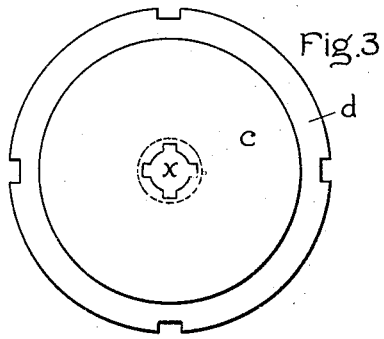
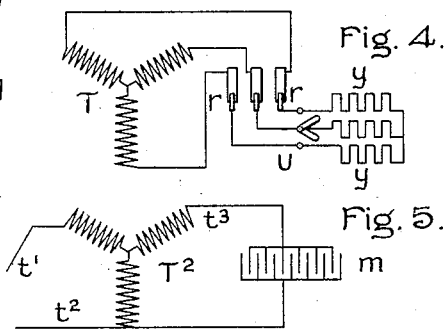
Witnesses.
Lewis T. Abell.
Benjamin B. Hall.
Inventor:
Elihu Thomson.
by Albert G. Davis
Atty.
THE NORRIS PETERS CO., PHOTO-LITHO., WASHINGTON, D. C.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

ALTERNATING-CURRENT ELECTRIC MOTOR.

SPECIFICATION forming part of Letters Patent No. 664,190, dated December 18, 1900.

Application filed August 19, 1897. Serial No. 648,774. (No model.)

*To all whom it may concern:*

Be it known that I, ELIHU THOMSON, a citizen of the United States, residing at Swampscott, in the county of Essex, State of Massachusetts, have invented certain new and useful Improvements in Alternating-Current Electric Motors, (Case No. 601,) of which the following is a specification.

My present invention relates to the combination of an automatic clutching device with a motor having a moderate or feeble starting torque, an example of which is a single-phase motor of the induction type provided with arrangements, such as "shading-coils," for the polar portions of the field for causing initial rotation when the motor has no resistance to overcome or is practically without load. My invention is therefore applicable to any type of motor in which there is but little starting torque to overcome the load which may be imposed, while the running torque or the torque at speed is of course assumed to be sufficient to carry the load. The "rotor" or rotary portion of such motor is provided with bearings independent of the shaft to be driven, upon which it is free to turn as an unloaded structure. Combined with the rotor is a clutch mechanism and a centrifugal device carried by the rotor, so adjusted that when a certain predetermined speed is attained the clutch is operated or gradually brought into action to cause the rotating part to give motion to the shaft from which the work is to be taken by a belt or otherwise.

The invention will be understood by reference to the accompanying drawings, in which—

Figure 1 is a side elevation, partly in section. Fig. 2 is an end elevation, partly in section; and Figs. 3, 4, and 5 are diagrams of the arrangements employed.

In Figs. 1 and 2, B B represent the usual base-plate, with standards J J supporting the shaft X, which is hollow and carries a pulley P for communicating the power. Suitable bearings are provided upon the pillars J J for the shaft. Concentric with the shaft is a stationary laminated magnetic structure S S, constructed, as usual in such machinery, of plates of iron packed together solidly and surrounded by a suitable supporting-casing, the laminæ being notched for the reception of a system of coils of wire A A, Fig. 2, it being assumed that such system of coils extends over a considerable portion of the internal periphery, so to speak, of the laminated structure S S. These coils are connected to terminals $t$ $t^2$ $t^3$ in any of the usual ways in motors of the type mentioned, so that a portion of the winding may be short-circuited to "shade" or modify the poles of the structure, as well known in the art, or a condenser shunted around a portion of the winding, and if of suitable capacity its effect will be the same—that is, it will tend to cause a slight rotation of the magnetic field as set up by the alternating current supplied to the system of coils, provided the said system is suitably proportioned and adapted to this end. Inside this laminated structure S S is the rotor R R, which is constructed of laminated iron and carried on a suitable support, with conductors $a$ $a$ embedded in its surface or between projections in the surface opposed to S S, the conductors being closed on themselves in what is known as "squirrel-cage" or equivalent closed winding. These are features of the ordinary motors as now known and which are not embraced in the present invention. The rotating part R is carried upon a circular support having bearings independent of the journals on the pillars J J, through which the shaft X passes. These independent bearings K K are preferably made, for simplicity, upon the shaft X itself, and to this end a sort of drum-like structure is constructed with openings at the ends, forming bearings at K K, and suitable collars $k$ $k$ are arranged or provided for limiting end motion. The shell which supports the rotating part R R is marked L and contains within it as one of the constructions in accordance with my invention a clutch mechanism, which is here shown as consisting of a considerable number of disks of sheet-steel placed near together around the shaft X. The disks or sheets are connected to the shaft and to the interior of the shell L alternately. Supposing the first disk to the right is connected to the shaft, the next is connected to the shell L— that is, free of the shaft, the third disk is connected to the shaft, but is free of the shell L, the fourth is free of the shaft, but is connected to L, and so on, as also shown in Fig. 3, where the disk c or front disk has keyways which fit over keys carried by the shaft X, while the disk d is larger than c on its periphery and has keyways or slots cut in its edge, which engage with projections over the interior surface of L, as shown in the section-lines at d, Fig. 2, while the opening in the center of the disk d is, as shown in dotted lines, Fig. 3, larger than the keys on the shaft, and so clears them. At one end of this pile of disks is a heavy plate, as at Q, Fig. 1, against which a lug or short arm of a governor-lever bears. The governor-weights G G typify any form of centrifugal device which, on tending outward due to centrifugal action, forces by suitable changes of leverage the plates within the casing L tightly together and which on a diminished speed leave these plates in a relaxed or comparatively free condition with respect to each other, and to this end a suitable spring Z may be provided to draw the weights G G inward on a diminution of speed, it being understood that a pair of such springs are preferably used, as indicated in Figs. 1 and 2, one on each side of the shaft.

Supposing now that the apparatus is at rest and an alternating electric current be sent through the stationary winding of the machine and that such arrangements are made that this current may impart a small rotative effort to the structure R R, mounted on the shell L, the spring Z will hold the weights G G inward, so that the structure R R may be free to turn, especially if the plates c d within the shell L are at this time lubricated. Rotation will then be imparted to R R and will gradually increase, while the torque in such a structure will naturally increase as the speed rises, so that the acceleration will go on progressively until at some predetermined speed the centrifugal force of G G is great enough to begin to bind the plates within the shell L together and cause the outer shell structure and the rotating part R R to carry the shaft X along with it. If a belt be upon the pulley P for driving machinery, this will not occur until a certain speed has been attained, or at least until a certain speed and torque have been accumulated in the rotating portion of the structure, and then the gradual increase of centrifugal force upon the weights G G will gradually bind the clutch and make the whole at full running speed practically a solidly-connected structure.

Of course it will be understood that variations in the arrangements of the centrifugal device may be employed, as well as variations in the type of the clutch which may be operated thereby, as also variations in the form or disposition of the parts of the motor, and still remain within the spirit of my invention, which, briefly, embodies a means or method of causing a feeble-torque electric motor to take its load, consisting in starting without load and upon predetermined speed conditions gradually bringing on the load or connections between the motor and the shaft or machinery to be driven thereby. As explanatory of the variations which may be made in the structure or arrangement I refer to Fig. 4, which shows diagrammatically a three-phase winding such as might be used instead of the squirrel-cage winding $a\,a$ on the rotating part. This is marked T and typifies a system of three coils or conductors joined in three-phase relation and wound together in well-recognized ways, while contact-rings $r\,r$ might be provided for connecting the free terminals of such a winding by means of stationary brushes to proper resistances Y, and a shunting-switch U may be employed to cut out the resistances at any time. This simply typifies a well-known arrangement employed in the art in starting induction-motors. So, also, the winding $a\,a$, Fig. 2, or the stationary winding might be a three-phase winding and an alternating-current source connected between $t'$ and $t^2$, while a condenser is indicated as connected at M, Fig. 5, between the terminals $t^2$ and $t^3$. This is a device which gives a starting effect when a single alternating current is used in what is called a "single-phase induction-motor." The starting effect or torque may in many types of motor be too feeble for overcoming the static resistance and friction of the work to be driven, and my invention provides an efficient means for overcoming this difficulty.

What I claim as new, and desire to secure by Letters Patent of the United States, is—

1. The combination of a shaft, means for connecting the shaft to some work-consuming device, an electric motor having a small torque at low speeds and a larger torque at higher speeds, a clutch for coupling the rotating member of the motor to said shaft, and automatic means for bringing the clutch into action when the torque of the motor is high and for causing the clutch to be out of operation or disengaged when the torque of the motor is low.

2. The combination of a shaft or similar rotating body, means for connecting the shaft or body to some work-consuming device, an alternating-current induction-motor of such design as to have a low starting torque and higher running torque, a clutch for coupling the rotating member of the induction-motor to said shaft or body, and automatic means for bringing the clutch into action when the torque of the motor is high and for causing the clutch to be out of operation or disengaged when the torque of the motor is low.

In witness whereof I have hereunto set my hand this 16th day of August, 1897.

ELIHU THOMSON

Witnesses:
JOHN W. GIBBONEY,
HENRY O. WESTENDARP.